US011438245B2

(12) United States Patent
Tao et al.

(10) Patent No.: US 11,438,245 B2
(45) Date of Patent: *Sep. 6, 2022

(54) SYSTEM MONITORING WITH METRICS CORRELATION FOR DATA CENTER

(71) Applicant: EMC IP Holding Company LLC, Hopkinton, MA (US)

(72) Inventors: Simon Tao, Shanghai (CN); Yu Cao, Beijing (CN); Xiaoyan Guo, Beijing (CN); Kenneth Durazzo, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/818,475

(22) Filed: Mar. 13, 2020

(65) Prior Publication Data
US 2020/0220796 A1 Jul. 9, 2020

Related U.S. Application Data

(63) Continuation of application No. 14/742,228, filed on Jun. 17, 2015, now Pat. No. 10,630,561.

(51) Int. Cl.
H04L 43/065 (2022.01)
H04L 43/08 (2022.01)

(52) U.S. Cl.
CPC ............ H04L 43/065 (2013.01); H04L 43/08 (2013.01)

(58) Field of Classification Search
None
See application file for complete search history.

(56) References Cited

U.S. PATENT DOCUMENTS

| | | | |
|---|---|---|---|
| 6,813,245 B1* | 11/2004 | Furuno | H04L 12/5601 370/252 |
| 8,661,299 B1 | 2/2014 | Ip | |
| 9,396,085 B2 | 7/2016 | Hoffmeister et al. | |
| 9,712,410 B1* | 7/2017 | Char | H04L 43/08 |
| 2005/0125675 A1 | 6/2005 | Weseloh | |
| 2009/0265450 A1 | 10/2009 | Helmer et al. | |
| 2010/0262860 A1 | 10/2010 | Sargor et al. | |
| 2011/0154367 A1* | 6/2011 | Gutjahr | H04L 41/065 719/316 |
| 2012/0054331 A1* | 3/2012 | Dagan | H04L 41/064 709/224 |
| 2012/0209571 A1 | 8/2012 | Peterson et al. | |
| 2013/0007258 A1* | 1/2013 | Stern | H04L 12/4641 709/224 |
| 2013/0290525 A1 | 10/2013 | Fedor et al. | |

(Continued)

Primary Examiner — Younes Naji
(74) Attorney, Agent, or Firm — Ryan, Mason & Lewis, LLP

(57) ABSTRACT

A first set of values for a set of metrics is obtained. A given metric of the set of metrics monitors a given component of a set of components of a computing system. The first set of values is obtained during a period of expected behavior of the computing system. One or more correlations are determined between values of the first set of values to establish one or more expected correlations between values of two or more metrics. A second set of values for the set of metrics is obtained. A determination is made as to whether values of the second set of values maintain the one or more expected correlations determined based on the first set of values.

20 Claims, 5 Drawing Sheets

(56) References Cited

U.S. PATENT DOCUMENTS

| | | |
|---|---|---|
| 2014/0297835 A1 | 10/2014 | Buys |
| 2015/0046123 A1 | 2/2015 | Kato |
| 2015/0074258 A1 | 3/2015 | Ferreira et al. |
| 2016/0203424 A1* | 7/2016 | Gaurav .............. G06Q 10/0631 |
| | | 705/7.12 |

* cited by examiner

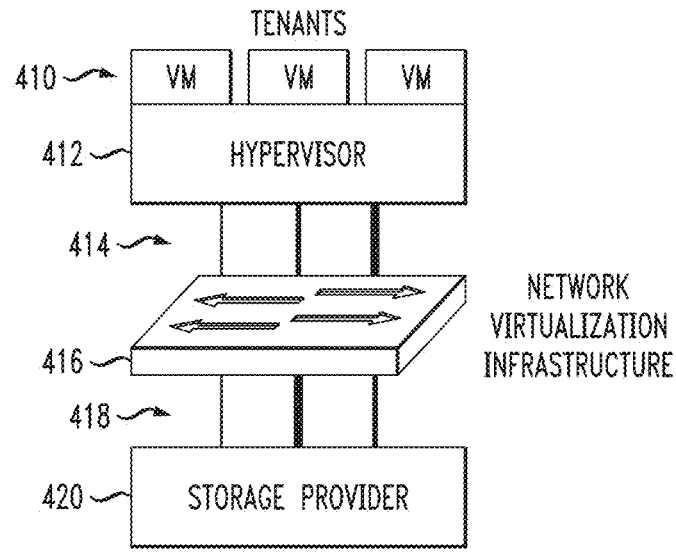

FIG. 5
500

| OBTAIN A FIRST SET OF VALUES FOR A SET OF METRICS, WHEREIN A GIVEN METRIC OF THE SET OF METRICS DISCRETELY MONITORS A GIVEN COMPONENT OF A SET OF COMPONENTS OF A COMPUTING SYSTEM, AND WHEREIN THE FIRST SET OF VALUES IS OBTAINED DURING A PERIOD OF EXPECTED BEHAVIOR OF THE COMPUTING SYSTEM | ~510 |
|---|---|
| DETERMINE ONE OR MORE CORRELATIONS BETWEEN VALUES OF THE FIRST SET OF VALUES TO ESTABLISH ONE OR MORE EXPECTED CORRELATIONS BETWEEN VALUES OF TWO OR MORE METRICS | ~520 |
| OBTAIN A SECOND SET OF VALUES FOR THE SET OF METRICS | ~530 |
| DETERMINE WHETHER VALUES OF THE SECOND SET OF VALUES MAINTAIN THE ONE OR MORE EXPECTED CORRELATIONS DETERMINED BASED ON THE FIRST SET OF VALUES | ~540 |

SYSTEM MONITORING WITH METRICS CORRELATION FOR DATA CENTER

CROSS-REFERENCE TO RELATED APPLICATION

This application is a continuation of U.S. patent application Ser. No. 14/742,228, filed on Jun. 17, 2015, the entire contents of which is hereby incorporated herein by reference.

FIELD

The field relates generally to computing environments, and more particularly to system monitoring in such computing environments.

BACKGROUND

A software-defined data center (SDDC) is a computing system wherein elements of the infrastructure, e.g., networking, storage, compute, etc., are virtualized and delivered to tenants (customers) of the data center as services. An SDDC is typically implemented in a cloud computing platform environment and the virtualized and delivered components are controlled through an Infrastructure-as-a-Service (IaaS) layer.

Various components in an SDDC expose management features via system metrics. For example, the storage layer may provide metrics for input/output (I/O) read/write bandwidth, average I/O read/write latency, cache hit rate, etc. The IaaS layer itself may collect infrastructure measurements. Usually, these system metrics are presented as a time series, i.e., a sequence of measurements made over a fixed time interval.

SUMMARY

Embodiments of the invention provide techniques for improved system monitoring in a computing environment.

For example, in one embodiment, a method comprises the following steps. A first set of values for a set of metrics is obtained. A given metric of the set of metrics monitors a given component of a set of components of a computing system. The first set of values is obtained during a period of expected behavior of the computing system. One or more correlations are determined between values of the first set of values to establish one or more expected correlations between values of two or more metrics. A second set of values for the set of metrics is obtained. A determination is made as to whether values of the second set of values maintain the one or more expected correlations determined based on the first set of values.

Advantageously, illustrative embodiments provide techniques for discovering correlations between system metrics using rule-based or statistical/learning-based approaches. Such correlations may be utilized in system problem detection. While the techniques are applicable to a wide range of computing systems, illustrative embodiments are implemented with an SDDC infrastructure.

These and other features and advantages of the invention will become more readily apparent from the accompanying drawings and the following detailed description.

BRIEF DESCRIPTION OF THE DRAWINGS

FIG. 4 illustrates an example of throughput measurement on a data path employing system monitoring with metrics correlation, according to an embodiment of the invention.

FIG. 5 illustrates a methodology for system monitoring with metrics correlation, according to an embodiment of the invention.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

It is realized herein that detecting problems in the SDDC by individually evaluating heterogenous system metrics is not effective. Firstly, it is very difficult to model normal (expected) system behavior in a complex system. Secondly, the traditional threshold-based approach, where a metric is evaluated against a threshold (e.g., if metric value is at or below the threshold value, then there is no system problem, but if above the threshold value, then there is a system problem) does not work in dynamic system scenarios as will be further explained below.

In order to overcome the above and other drawbacks with conventional system monitoring approaches, illustrative embodiments provide SDDC monitoring and problem detection using system metric correlation techniques. As illustratively used herein, the term "correlation" refers to a relationship between data values from two or more system metrics. Further, as illustratively used herein, the term "metric" refers to a measure of a particular characteristic of a system's performance, operation, efficiency and/or behavior.

Figure 1:
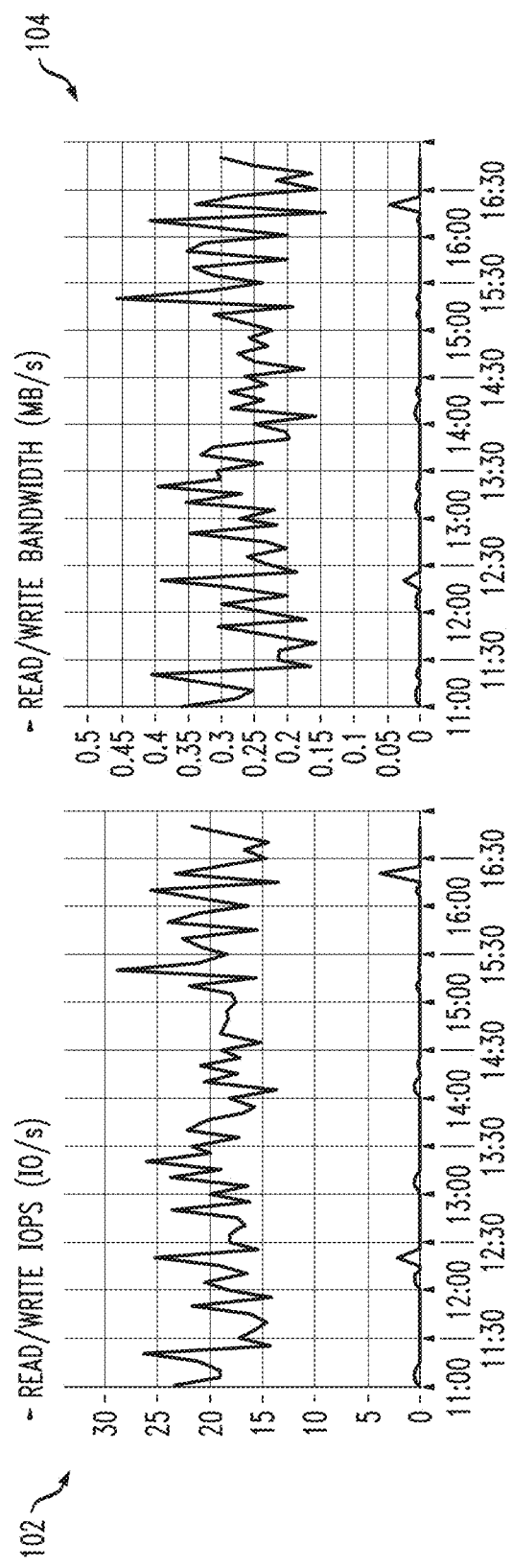
FIG. 1 illustrates graphical examples of system metrics in time series, according to an embodiment of the invention.

FIG. 1 illustrates graphical examples of system metrics in time series, according to an embodiment of the invention. Graph 102 represents a read/write inputs/outputs per second (IOPS) metric (defined in units of IO/s), while graph 104 represents a read/write bandwidth metric (defined in units of MB/s).

More particularly, illustrative embodiments provide an infrastructure monitoring system for an SDDC that takes into account descriptions of each of the architectural components of the SDDC and interactions between them. Correlations are discovered using rule-based or statistical/machine learning-based approaches. Such correlations are utilized in system problem detection.

It is realized herein that the operational behaviors of a system as complex as an SDDC are very difficult to characterize. Typically, many complex systems are composed of a large number of interacting components, abstracted into multiple layers. In an SDDC, components of the infrastructure (e.g., storage, networking, compute, etc.) are virtualized and delivered as a service, by exploiting virtualization concepts such as abstraction, pooling and automation. Operation of the entire SDDC infrastructure typically requires a fully automated, intelligent control system to meet application service level agreements (SLAs) by optimizing resource configuration and remedying faulty configuration or system states in a timely manner. To achieve this goal, improving the effectiveness of monitoring and problem detection for such a complex environment is an important task.

For monitoring and evaluating the "health" of an SDDC, it is realized herein that it would be helpful to have prior knowledge of how the system should behave in general in different circumstances. That is, the monitoring goal can be achieved if it is possible to construct a system model to capture expected system behavior or to enumerate the expected behavior for every circumstance. Unfortunately, because of the inherent complexity in an SDDC, such system modeling is either very difficult or infeasible to implement.

It is realized herein that, to effectively monitor a system and detect problems, we need to inspect system metrics and sift out anomaly from regularity. However, the traditional threshold-based approach for each individual metric does not work well in such a setting for at least the following reasons: the highly dynamic nature inherent in an SDDC results in large variations in system metrics, which in turn, makes it difficult to determine a reasonable threshold value statistically; the actual workloads running in the SDDC are highly varied; and to construct a system model by learning from metrics that have variation or seasonality in their nature is no trivial task.

Accordingly, illustrative embodiments track the "health" of a system infrastructure such as an SDDC by monitoring the system effectively by characterizing the underlying system behavior with metric correlation rather than establishing a system model for explicit system behavior reasoning.

Figure 2:
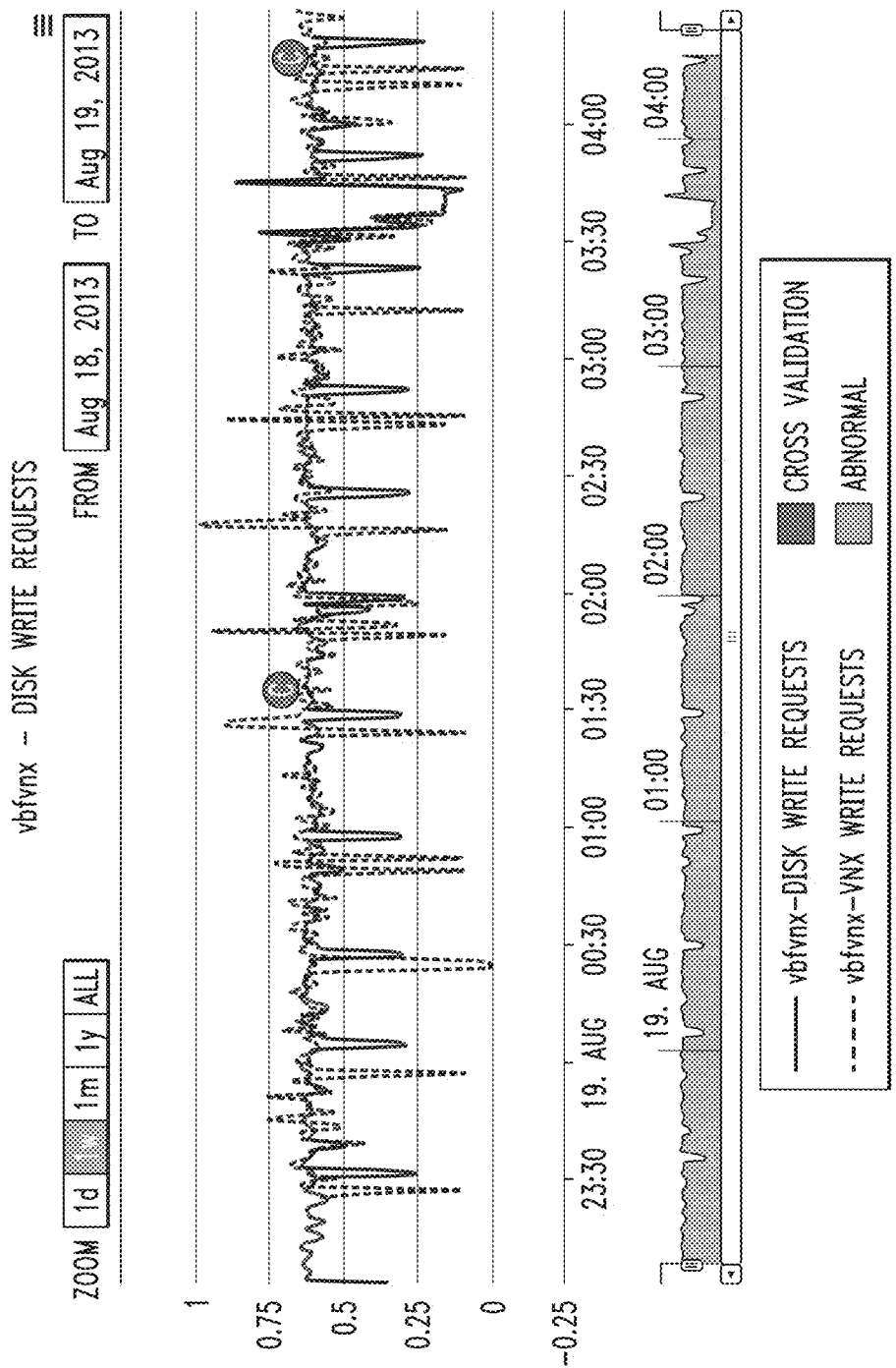
FIG. 2 illustrates a graphical example of system metrics correlation, according to an embodiment of the invention.

Correlations can be employed for capturing important invariants in the system behavior. For example, FIG. 2 depicts the time series example 200 for a number of disk write requests collected by two discrete monitoring tools (e.g., Ceilometer from OpenStack and VNX Analyzer from EMC Corporation), respectively. OpenStack is an open-source software platform that enables IaaS layer functionalities. Domain knowledge tells us that the value of one metric from one of the tools should agree with the other. If the number (value) of disk write requests from Ceilometer is notably smaller than the value from VNX Analyzer in some sample window, we may suspect there is some unauthorized data access to a VNX device (storage array), outside of the management domain of the OpenStack layer. As shown in FIG. 2, divergence between the two metric values (i.e., between the two time series data plots) is notable in the time period between the two points in time denoted by the letter Cs. Such divergence may indicate a system problem, e.g., potential unauthorized data access.

To capture stable correlations among system metrics, time series are collected for the monitored metrics (as historical data), during the time when the system behavior conforms to what is expected, that is, the system is operating in "good health." Then, the metrics time series are used for discovering correlations. The underlying SDDC system is monitored continuously and, if at any point of time, the established correlations are no longer maintained, a system alert is triggered for the effected metrics.

Figure 3:
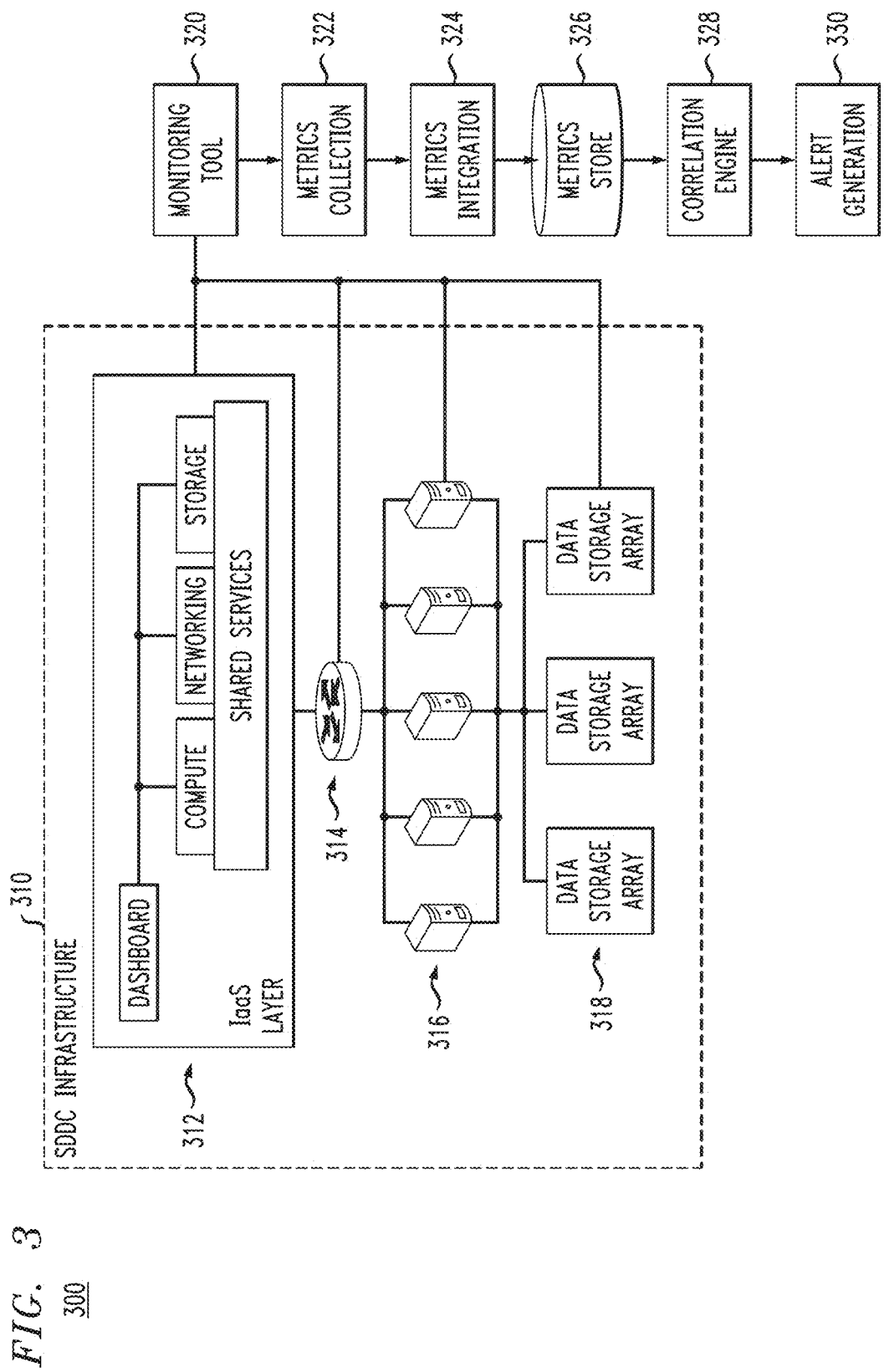
FIG. 3 illustrates a system monitoring architecture with metrics correlation, according to an embodiment of the invention.

FIG. 3 illustrates a system monitoring architecture with metrics correlation, according to an embodiment of the invention. As shown, system monitoring architecture 300 comprises SDDC infrastructure 310, which itself comprises an IaaS layer 312, networking components 314 (e.g., routers, switches, etc.), compute components 316 (e.g., servers, hosts, etc.), and storage components 318 (e.g., storage arrays, storage devices, etc.).

By way of example only, the IaaS layer 312 may be implemented using OpenStack. As is known, OpenStack is a software platform that controls pools of compute, storage, and networking resources throughout a data center, managed through a dashboard or via the OpenStack application programming interface (API). OpenStack operates with enterprise and open source technologies enabling use with a wide variety of heterogeneous infrastructure components. Examples of storage arrays 318 may include, but are not limited to, VNX, VPLEX and Isilon storage systems (commercially available from EMC Corporation, Hopkinton, Mass.).

System monitoring architecture 300 also comprises monitoring tools module 320, metrics collection module 322, metrics integration module 324, metrics store 326, correlation engine 328, and alert generation module 330.

Monitoring tools module 320 receives output from existing monitoring tools that are integrated in the layers/components of SDDC infrastructure 310. Some examples of existing monitoring tools include, but are not limited to, Ceilometer for monitoring OpenStack 312, and Watch4Net (commercially available from EMC Corporation, Hopkinton, Mass.) for monitoring storage arrays/devices 318. Module 320 may also comprise separate standalone monitoring tools, i.e., not necessarily integrated with or part of the infrastructure component but which are configured to monitor operation, performance, behavior, etc., of an infrastructure component. The monitoring tools that are part of module 320 or that report to module 320 are the sources of system metrics data for use by the monitoring system 300, as will be further explained herein.

The metrics values from the various data sources (monitoring tools 320) are sent to metrics collection module 322, which is responsible for collecting and providing the metrics values to metrics integration module 324.

Metrics integration module 324 conditions the raw metrics data to transform the raw metrics data into unified (common) metrics data for facilitating correlation. More particularly, the collected metrics data are conditioned by metrics integration module to make it easier to discover one or more correlations between them despite the heterogeneity of the various metrics data. Examples of conditioning include, but are not limited to, the following data transformation techniques. Some of the metrics are collected as accumulating values, which may mask variations in correlation. Such metrics are transformed by module 324 into incremental values within certain time windows to better determine whether there is correlation between values of any two metrics. By way of further example, metrics data from distinct sources may not be sampled at the same time interval, or with the same sampling rate. Thus, module 324 transforms the metric data by sampling it using a unified (common) sampling methodology. One ordinarily skilled in the art will appreciate other data conditioning techniques that can be used to provide homogeneity to the otherwise heterogeneous metrics data.

Metrics store 326 persists the metrics data (raw and conditioned), and provides the conditioned data to correlation engine 328. Correlation engine 328 conducts correlation discovery and monitoring. More particularly, in an illustrative embodiment, the correlation engine performs two main tasks: (i) execute a correlation discovery operation on the historical (past) data from the metrics store (e.g., in a batch mode) to determine expected correlations between data of two or more metrics; and (ii) receives metrics continuously (from metrics store or directly from metrics integration module) to conduct real-time correlation monitoring by validating whether or not the real-time (current) metrics data conforms to the discovered (expected) correlations. In the monitoring system, any instance of correlation violation triggers a system alert which is the indicator of a potential system problem. The system alert is generated by alert generation module 330, and can be presented to a system operator or some other remedial system (not expressly shown).

More specifically, the discovery/establishment of correlations can be conducted using the following illustrative procedure. Correlations can be discovered or established either with domain knowledge presented as rules or by mining from historical data.

Some of the system invariants, i.e., correlations, can be directly determined from domain knowledge. The correct understanding of the internal structure of SDDC deployment and configuration can be captured as rules that define the explicit correlations between system metrics. For example, in an SDDC, the data access throughput associated with a logical storage unit (LUN) instantiated on a storage devices (318) should agree with the aggregate throughput of data access from the virtual machines (VMs) instantiated on a server (316) for that particular LUN. A second example of domain knowledge is that end-to-end data latency should be the sum of the latency contributed by each hop in the data path.

The metrics correlations can also be mined from historical data with some statistical or machine learning methods, when the inter-dependence between the metrics is beyond the capability of human reasoning or no proper domain knowledge is available from operators. These types of correlations may be subtle and may thus be implicit. For these correlation types, illustrative embodiments provide an approach to discover inter-dependency using statistical or machine learning-based methods. First, one or more statistical methods can be used to identify close related metrics. For example, by calculating Pearson's correlation coefficient, all the linearly related pairs of metrics can be discovered. Second, a machine learning algorithm can be applied to specifically determine how those pairs of metrics are correlated. In illustrative embodiments, linear regression can be applied to capture the linear correlation and a more sophisticated regression model can be applied for non-linear correlations.

With such an approach, the system can efficiently model the correlation of metric pairs, which are characteristics of a healthy operational status of the SDDC infrastructure. By detecting the violations to the system invariants established either with rule-based or statistical/learning based method, system problems are identified (e.g., running out of system resources, network communication failures, or unmonitored (potentially unauthorized) data accesses). By modeling the correlation among metrics, illustrative embodiments capture the essential aspects of SDDC system behavior regardless of its inherent dynamic nature.

FIG. 4 illustrates an example of throughput measurement on a data path employing system monitoring with metrics correlation, according to an embodiment of the invention. More particularly, example 400 illustrates data accessing latency and security monitoring in an SDDC. It is realized herein that, in an SDDC, some metrics correlations are explicit. For example, aggregate data access throughput to a virtual disk backed by a LUN should be equal to the data throughput metrics collected on the SAN (storage area network) device for that particular LUN.

After being captured as rules in the monitoring system, any violation will be flagged as a system problem. For example, one cause for this particular violation may be from some unauthorized data access, which imposes a security threat.

This is visually illustrated in FIG. 4 where a set of VMs are instantiated via a hypervisor layer 412 running on a host server (not expressly shown). The VMs 410 are operatively coupled to storage devices that instantiate LUNs (in storage provider 420). Network virtualization infrastructure 416 couples the host server and storage devices. Data throughput associated with the VMs is respectively visualized as data throughput lines 414, while the data throughput associated with the LUNs is respectively visualized by data throughput lines 418. The lines represent data paths and the thickness of the lines represents the amount of data throughput (thicker line means more data throughput and thinner lines means less data throughput). Note how the leftmost lines in 414 and 418 are the same thickness. This is what would be expected, i.e., data sent to/from a VM from/to a LUN is equal. However, now see the centermost lines in 414 and 418 where it appears that more data is being output from a LUN than is actually going to a corresponding VM, and the rightmost lines in 414 and 418 where it appears that more data is being sent from a VM than is actually going to a corresponding LUN. The imbalance of data throughput in this example is a potential indicator that data is being accessed by an unauthorized person or system (either the unauthorized access is intercepting data intended for a VM or a LUN).

In accordance with illustrative embodiments, the above mentioned data access correlation between two different metrics (one being VM data throughput, and the other being LUN data throughput) is captured in the expected scenario (leftmost scenario in example 400) and then real-time correlation is tested to determine if the correlation is maintained. If it is not maintained (centermost and rightmost scenarios in example 400), a system alert is generated.

FIG. 5 illustrates a methodology 500 for system monitoring with metrics correlation, according to an embodiment of the invention. As shown, step 510 obtains a first set of values for a set of metrics. A given metric of the set of metrics discretely monitors a given component of a set of components of a computing system. The first set of values is obtained during a period of expected behavior of the computing system. Step 520 determines one or more correlations between values of the first set of values to establish one or more expected correlations between values of two or more metrics. Step 530 obtains a second set of values for the set of metrics. Step 540 determines whether values of the second set of values maintain the one or more expected correlations determined based on the first set of values.

Figure 6:
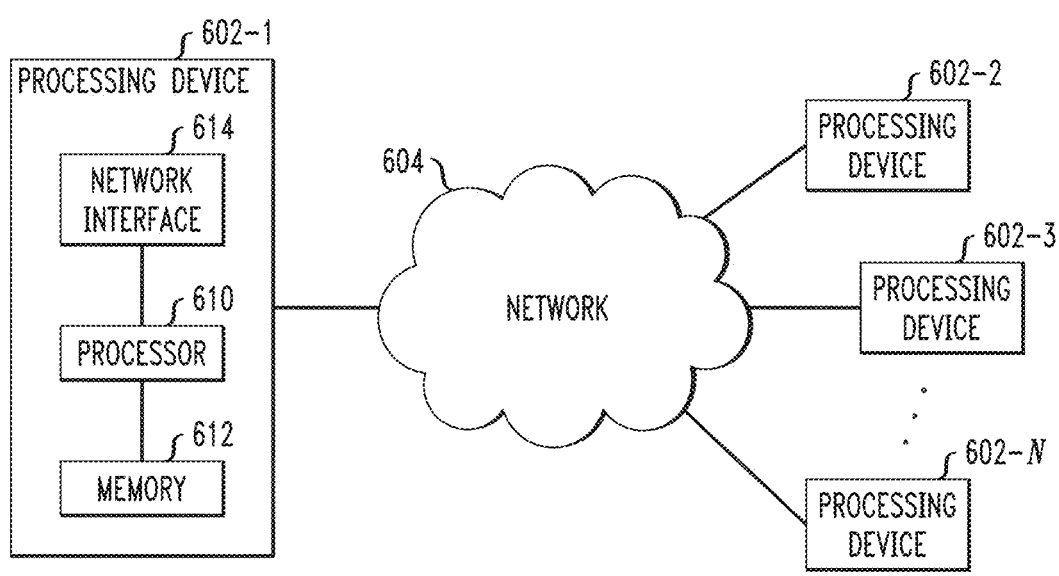
FIG. 6 illustrates a processing platform used to implement a system monitoring architecture with metrics correlation, according to an embodiment of the invention.

As an example of a processing platform on which system monitoring with metrics correlation (e.g., 300 of FIG. 3) can be implemented is processing platform 600 shown in FIG. 6. It is to be appreciated that processing platform 600 may implement both the monitoring and correlation modules and functionalities described herein, as well as the monitored system (e.g., SDDC) itself.

The processing platform 600 in this embodiment comprises a plurality of processing devices, denoted 602-1, 602-2, 602-3, . . . 602-N, which communicate with one another over a network 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the network 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the federated web crawling and storage system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 600 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and VPLEX (commercially available from EMC Corporation, Hopkinton, Mass.). A variety of other computing and storage products may be utilized to implement the one or more services that provide the functionality and features described herein.

It was noted above that portions of the system environment 600 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
monitoring, with one or more monitoring tools, data throughput between at least one virtualized machine and a network virtualization infrastructure of a computing system to obtain a first metric of data throughput, and data throughput between at least one storage device dedicated to the at least one virtualized machine and the network virtualization infrastructure to obtain a second metric of data throughput, wherein the computing system is a software-defined data center;
comparing the first metric of data throughput with the second metric of data throughput;
automatically transmitting, with an alert generation module of the computing system, an alert indicative of a lack of one or more expected correlations of the first and second metrics; and
causing implementation of, via a remedial entity associated with the computing system, one or more select remedial actions to address the lack of the one or more expected correlations of the first and second metrics;
wherein the alert is generated in response to detection of an imbalance between the first metric of data throughput and the second metric of data throughput;
wherein the imbalance comprises one or more differences between the first metric of data throughput and the second metric of data throughput; and
wherein the monitoring, comparing, transmitting and causing implementation steps are performed by at least one processing device, comprising a processor operatively coupled to a memory.

2. The method of claim 1, wherein the one or more expected correlations are determined via a rule derived from domain knowledge.

3. The method of claim 1, wherein the one or more expected correlations are determined via one or more machine learning algorithms.

4. The method of claim 1, wherein automatically, transmitting includes notifying the remedial entity, associated with the computing system.

5. The method of claim 1, further comprising conditioning:
first values of data throughput obtained between the at least one virtual zed machine and the network virtualization infrastructure; and
second values of data throughput obtained between the at least one storage device and the network virtualization infrastructure.

6. The method of claim 5, wherein conditioning further comprises
transforming at least a portion of the first values and the second values to generate the first metric and the second metric.

7. The method of claim 5, wherein the first values and the second values are obtained via the one or more monitoring tools.

8. The method of claim 7, wherein the one or more monitoring, tools are at least partially integrated with a component of the computing system.

9. The method of claim 7, wherein the one or more monitoring tools are not integrated with a component of the computing system.

10. The method of claim 7, further comprising storing the first values and the second values.

11. The method of claim 1, wherein the one or more differences includes the first metric of data throughput being greater than or less than the second metric of data throughput.

12. The method of claim 11, wherein the one or more differences includes the second metric of data throughput being greater than the first metric of data throughput.

13. An article of manufacture comprising a non-transitory processor-readable storage medium having encoded therein executable code of one or more software programs, wherein the one or more software programs when executed by one or more processing devices implement steps of:
monitoring, with one or more monitoring tools, data throughput between at least one virtualized machine and a network virtualization infrastructure of a computing system to obtain a first metric of data throughput, and data throughput between at least one storage device dedicated to the at least one virtualized machine and the network virtualization infrastructure to obtain a second metric of data throughput, wherein the computing system is a software-defined data center;
comparing the first metric of data throughput with the second metric of data throughput;
automatically transmitting, with an alert generation module of the computing system, an alert indicative of a lack of one or more expected correlations of the first and second metrics; and
causing implementation of, via a remedial entity associated with the computing system, one or more select remedial actions to address the lack of the one or more expected correlations of the first and second metrics:
wherein the alert is generated in response to detection of an imbalance between the first metric of data throughput and the second metric of data throughput; and
wherein the imbalance comprises one or more differences between the first metric of data throughput and the second metric of data throughput.

14. An apparatus comprising:
a memory; and
a processor operatively coupled to the memory and configured to:
monitor, with one or more monitoring tools, data throughput between at least one virtualized machine and a network virtualization infrastructure of a computing system to obtain a first metric of data throughput, and data throughput between at least one storage device dedicated to the at least one virtualized machine and the network virtualization infrastructure to obtain a second metric of data throughput, wherein the computing system is a software-defined data center;
compare the first metric of data throughput with the second metric of data throughput;
automatically transmit, with an alert generation module of the computing system, an alert indicative of a lack of one or more expected correlations of the first and second metrics; and cause implementation of, via a remedial entity associated with the computing system, one or more select remedial actions to address the lack of the one or more expected correlations of the first and second metrics;

wherein the alert is generated in response to detection of an imbalance between the first metric of data throughput and the second metric of data throughput; and wherein the imbalance comprises one or more differences between the first metric of data throughput and the second metric of data throughput.

15. The apparatus of claim 14, wherein the one or more expected correlations are determined via a rule derived from domain knowledge.

16. The apparatus of claim 14, wherein the one or more expected correlations are determined via one or more machine learning algorithms.

17. The apparatus of claim 14, wherein automatically transmitting includes notifying the remedial entity associated with the computing system.

18. The apparatus of claim 14, further comprising conditioning:

first values of data throughput obtained between the at least one virtualized machine and the network virtualization infrastructure; and second values of data throughput obtained between the at least one storage device and the network virtualization infrastructure.

19. The apparatus of claim 18, wherein conditioning further comprises transforming at least a portion of the first values and the second values to generate the first metric and the second metric.

20. The apparatus of claim 14, wherein the one or more differences includes at least one of the following:

the first metric of data throughput being greater than or less than the second metric of data throughput; and the second metric of data throughput being greater than the first metric of data throughput.

* * * * *